United States Patent
Terada et al.

(10) Patent No.: US 9,910,214 B2
(45) Date of Patent: Mar. 6, 2018

(54) PLANAR ILLUMINATION DEVICE

(71) Applicant: MINEBEA CO., LTD., Kitasaku-gun, Nagano (JP)

(72) Inventors: Naoyuki Terada, Iwata (JP); Ippei Kusunoki, Fukuroi (JP)

(73) Assignee: MINEBEA CO., LTD., Nagano (JP)

( * ) Notice: Subject to any disclaimer, the term of this patent is extended or adjusted under 35 U.S.C. 154(b) by 0 days.

(21) Appl. No.: 15/155,799

(22) Filed: May 16, 2016

(65) Prior Publication Data

US 2016/0341889 A1 Nov. 24, 2016

(30) Foreign Application Priority Data

May 22, 2015 (JP) .................. 2015-104718

(51) Int. Cl.
  *F21V 7/04* (2006.01)
  *F21V 8/00* (2006.01)
  *G02F 1/1333* (2006.01)

(52) U.S. Cl.
  CPC ......... *G02B 6/0091* (2013.01); *G02B 6/0088* (2013.01); *G02F 1/133308* (2013.01); *G02F 2001/13332* (2013.01); *G02F 2001/133328* (2013.01)

(58) Field of Classification Search
  CPC .............. G02B 6/0088; G02B 6/0091; G02F 1/133308; G02F 2001/13332; G02F 2001/133328; H04N 5/64
  USPC ....................................................... 362/606
  See application file for complete search history.

(56) References Cited

U.S. PATENT DOCUMENTS

| 5,986,726 | A | * | 11/1999 | Murai ............... | G02F 1/133308 349/58 |
| 2002/0008806 | A1 | * | 1/2002 | Natsuyama ....... | G02F 1/133308 349/62 |
| 2003/0067564 | A1 | * | 4/2003 | Sato .................. | G02F 1/133308 349/58 |
| 2004/0141102 | A1 | * | 7/2004 | Lin ................... | G02F 1/133308 349/58 |

(Continued)

FOREIGN PATENT DOCUMENTS

JP 2000-331521 A 11/2000
JP 2004-240239 A 8/2004

(Continued)

OTHER PUBLICATIONS

Jun. 28, 2017 Office Action issued in Japanese Application No. 2015-104718.

*Primary Examiner* — Claude J Brown
(74) *Attorney, Agent, or Firm* — Oliff PLC

(57) ABSTRACT

A planar illumination device according to an embodiment, including: a light guiding plate having one of a pair of opposite principal surfaces serving as a light emission surface; a light source arranged at a side surface connecting end edges of the pair of principal surfaces of the light guiding plate; and a frame, in which the light guiding plate is arranged. The frame is formed of plural frame members arranged along side surfaces of the light guiding plate. The plural frame members are configured to include a resin frame member and a metal frame member, and to have a joint portion between the resin frame member and the metal frame member, the joint portion arranged at end portions of the resin frame member and the metal frame member.

14 Claims, 4 Drawing Sheets

(56) References Cited

U.S. PATENT DOCUMENTS

| | | | | |
|---|---|---|---|---|
| 2005/0151895 A1* | 7/2005 | Fukuyoshi | ........ | G02F 1/133308 349/58 |
| 2005/0285993 A1* | 12/2005 | Nishiura | ........... | G02F 1/133308 349/58 |
| 2006/0125981 A1* | 6/2006 | Okuda | .............. | G02F 1/133308 349/110 |
| 2010/0321605 A1* | 12/2010 | Sakuma | ............ | G02F 1/133308 349/58 |
| 2011/0122651 A1* | 5/2011 | Komano | ................ | G02B 6/002 362/611 |
| 2014/0055713 A1* | 2/2014 | Kuroyanagi | ...... | G02F 1/133308 349/58 |
| 2014/0362539 A1* | 12/2014 | Huang | ................ | H05K 7/20963 361/721 |
| 2015/0208523 A1* | 7/2015 | Lee | .......................... | H05K 5/02 361/679.01 |
| 2015/0260908 A1* | 9/2015 | Kiguchi | ................ | G02B 6/0051 349/58 |
| 2015/0316811 A1* | 11/2015 | Uematsu | ........... | G02F 1/133308 349/58 |
| 2017/0261180 A1* | 9/2017 | Nakamura | ................ | F21V 9/00 |

FOREIGN PATENT DOCUMENTS

| | | |
|---|---|---|
| JP | 2007-047693 A | 2/2007 |
| JP | 2009-080947 A | 4/2009 |

* cited by examiner

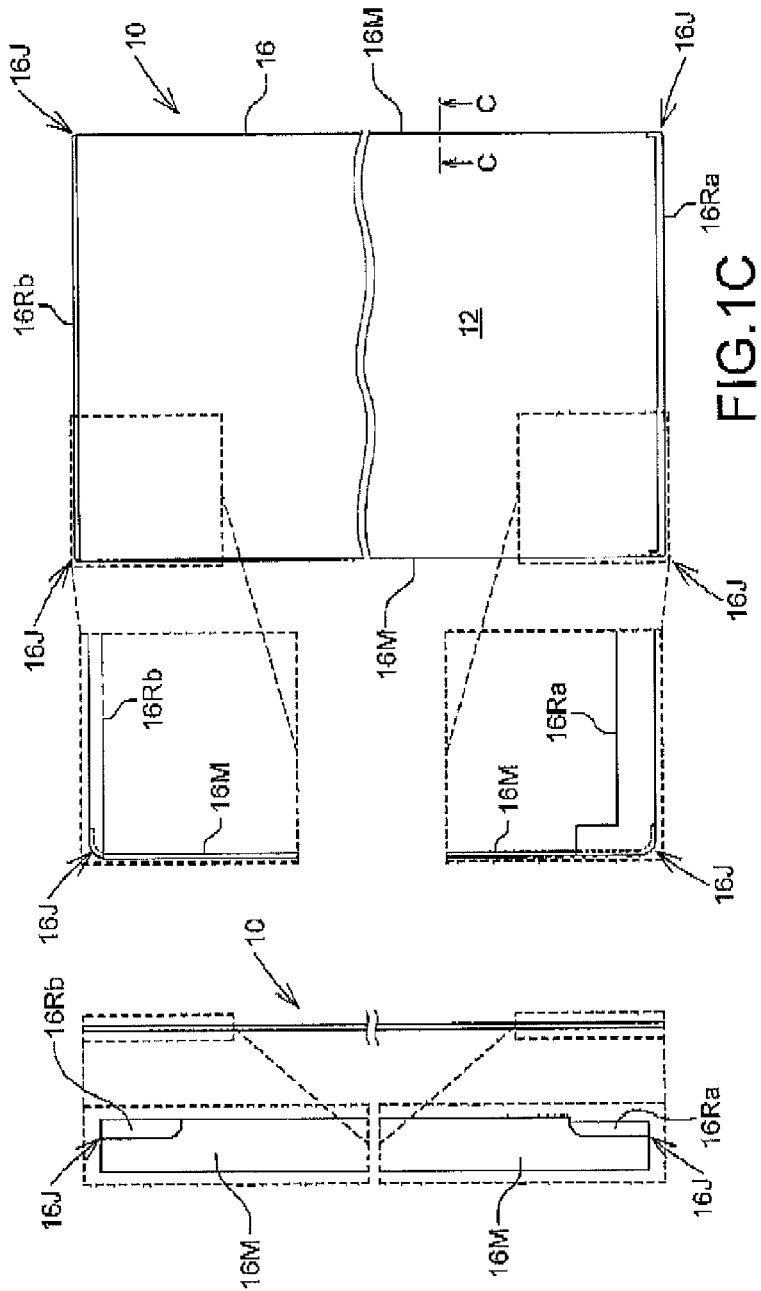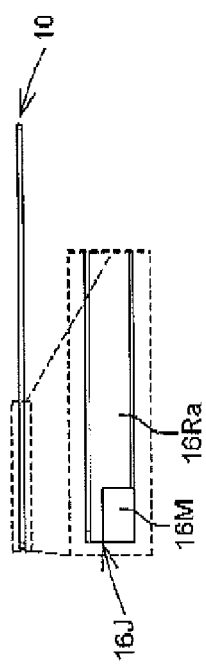

PLANAR ILLUMINATION DEVICE

CROSS-REFERENCE TO RELATED APPLICATION(S)

The present application claims priority to and incorporates by reference the entire contents of Japanese Patent Application No. 2015-104718 filed in Japan on May 22, 2015.

BACKGROUND OF THE INVENTION

1. Field of the Invention

The present invention relates to a planar illumination device including: a light guiding plate; a light source arranged at a side surface of the light guiding plate; and a frame for accommodating therein these components.

2. Description of the Related at

At present, liquid crystal display devices (LCDs) are used as display devices of electronic devices, such as personal computers and mobile phones, and since liquid crystal is not a light emitting type display element, planar illumination devices are widely used as illuminating means used in combination with liquid crystal display devices.

A schematic configuration of a planar illumination device 100 includes, as illustrated in FIGS. 6A-6C, components, which are: a light guiding plate 12, which is formed of a synthetic resin material, has one (surface) of a pair of opposite principal surfaces serving as a light emission surface, and is rectangular in a plan view thereof; a reflecting sheet 118 arranged on a reverse surface side of the light guiding plate 12; and plural plate shaped (or sheet shaped) members, such as an optical sheet 18 of plural layers (three layers in the example in FIGS. 6A-6C) arranged on a surface side of the light guiding plate 12. Inside a frame 116, which, in the example of FIGS. 6A-6C, has a bottomed box shape and is made of sheet metal, these components are stored, together with a light source 14, such as a white LED, which is arranged opposite to a side surface (a light incident surface) of the light guiding plate 12, the side surface connecting end edges of the pair of principal surfaces.

The frame 116 made of sheet metal includes a bottom portion 116Ma, a first side wall 116Mb, and a second side wall 116Mc. The first side wall 116Mb is arranged along each of a pair of side surfaces 12f connecting end edges of a side surface of the light guiding plate 12 at a light incident surface 12d side with end edges of a side surface 12e opposite to the light incident surface 12c. The second side wall 116Mc is arranged along each of the light incident surface 12c of the light guiding plate 12 and the side surface 12e opposite to the light incident surface 12c. The bottom portion 116Ma is arranged to block a region surrounded by the first side wall 116Mb and the second side wall 116Mc. Both the first side wall 116Mb and the second side wall 116Mc are configured to stand up integrally with and from the bottom portion 116Ma.

Furthermore, in the frame 116 made of sheet metal, a pair of resin portions 116Ra and 116Rb are arranged, which are respectively opposite to the light incident surface 12c of the light guiding plate 12 and the side surface 12e opposite to the light incident surface 12c. The resin portions 116Ra and 116Rb are, for example, bar shaped members, having rectangular cross sections. In the example of FIGS. 6A-6C, the resin portions 116Ra and 116Rb are integrated with the frame 116 made of sheet metal, through insert molding (for example, see Japanese Patent Application Laid-open No 2004-240239).

Moreover, a light shielding sheet 20 prescribing an effective area of the emission surface is used as a means to fix the optical sheet 18 to the frame 116 and the planar illumination device 100 to an LCD (illustration thereof omitted). In the example of FIGS. 6A-6C, the light shielding sheet 20 is a double sided adhesive sheet, and one of surfaces thereof (lower surface) is stuck over an upper surface of the optical sheet 18 and an upper surface of the frame 116. The other one of the surfaces (upper surface) is stuck to the LCD (see the specification of Japanese Patent Application No. 2014-216444).

One of reasons for using the frame 116 made of sheet metal like in the example of FIGS. 6-6C is to meet a demand for frame narrowing of the display device and the planar illumination device, which is the illuminating means of the display device, in order to downsize the liquid crystal display device and to improve the design. In order to deal with reduction in adhesive area of the light shielding sheet 20 with respect to the upper surface of the frame 116 made of metal, the reduction in adhesive area caused by the frame thickness reduction, the pair of resin portions 116Ra and 116Rb, which are arranged at positions respectively opposite to the light incident surface 12c and the side surface 12e opposite to the light incident surface 12c, are also used as a means to secure the adhesive area of the light shielding sheet 20.

However, for the planar illumination device, in addition to the reduction in thickness and securing the necessary rigidity, further frame narrowing is demanded.

The present invention has been made in view of the above described problems, and an object thereof is to balance characteristics with one another even more highly, the characteristics such as frame narrowing, reduction in thickness, and securing necessary rigidity, which are demanded for a planar illumination device.

SUMMARY OF THE INVENTION

It is an object of the present invention to at least partially solve the problems in the conventional technology.

A planar illumination device according to an embodiment, including: a light guiding plate having one of a pair of opposite principal surfaces serving as a light emission surface; a light source arranged at a side surface connecting end edges of the pair of principal surfaces of the light guiding plate; and a frame, in which the light guiding plate is arranged.

The frame is formed of plural frame members arranged along side surfaces of the light guiding plate.

The plural frame members are configured to include a resin frame member and a metal frame member, and to have a joint portion between the resin frame member and the metal frame member, the joint portion arranged at end portions of the resin frame member and the metal frame member.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A is a plan view and enlarged views of main parts of a planar illumination device according to an embodiment of the present invention with a light shielding sheet being omitted therefrom;

FIG. 1B is a side view thereof where mainly a metal frame member and an enlarged view of main parts of the planar illumination device according to the embodiment of the present invention with the light shielding sheet being omitted therefrom;

FIG. 1C is a side view thereof where mainly a resin frame member and enlarged views of main parts of the planar illumination device according to the embodiment of the present invention with a light shielding sheet being omitted therefrom;

DETAILED DESCRIPTION OP THE PREFERRED EMBODIMENTS

Figure 2A:
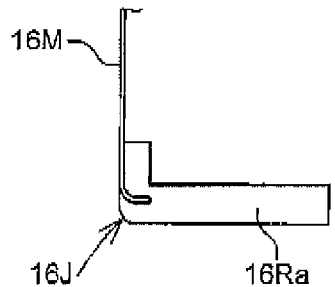
FIG. 2A is a plan view illustrating main parts according to an application example of the planar illumination device illustrated in FIGS. 1A-1C with the main parts enlarged.

Hereinafter, an embodiment of the present invention will be described, based on the drawings. To portions that are the same as, or to portions corresponding to, those of the conventional technique, the same reference signs will be appended and detailed description thereof will be omitted, as appropriate. Further, "upper" and "lower" directions in the following description mean upper and lower directions in a state where a planar illumination device and a liquid crystal display device in the description have been placed flatly. Furthermore, "front" direction is a direction from a light incident surface 12c of a light guiding plate towards a side surface 12e opposite to the light incident surface 12c in the state where the planar illumination device and the liquid crystal display device in the description have been placed flatly, and "back" direction means a direction reverse to the "front" direction. Hereinafter the light incident surface 12c is also referred to as a side surface 12c. "Left" and "right" directions mean directions orthogonal to a front-back direction in the state where the planar illumination device and the liquid crystal display device in the description have been placed flatly. Moreover, "inner" at each portion means a central portion side of the devices in the state where the planar illumination device and the liquid crystal display device in the description have been placed flatly, and "outer" means a side opposite to the central portion side of the devices.

In FIGS. 1A-1C illustrate a planar illumination device 10 according to an embodiment of the present invention. This planar illumination device 10 follows the overall configuration of the conventional technique, and thus, description thereof will be made below while referring also to the planar illumination device 100 according to the conventional technique illustrated in FIGS. 6A-C. This planar illumination device 10 includes, a light guiding plate 12, a light source 14, and, in the illustrated example, a frame 16 for positioning these components. The frame 16 is formed in a rectangular frame shape in a plan view thereof, and is formed of plural frame members arranged along side surfaces of the light guiding plate 12. These plural frame members include resin frame members 16Ra and 16Rb, and a pair of metal frame members 16M, and have, at end portions of the resin frame members 16Ra and 16Rb and the metal frame members 16M, joint portions 16J arranged therein, which are for joining the resin frame members 16Ra and 16Rb and the metal frame members 16M together.

Figure 6A:
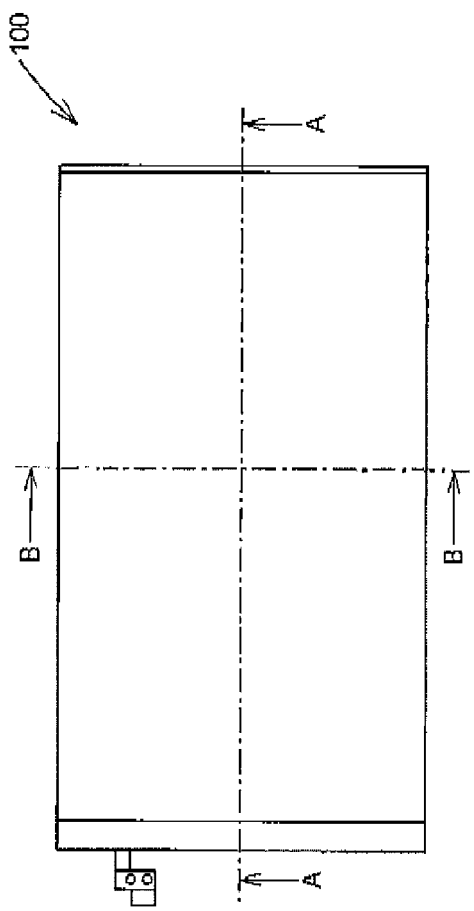
FIG. 6A is a plan view of an example of a conventional planar illumination device.
Figure 6C:
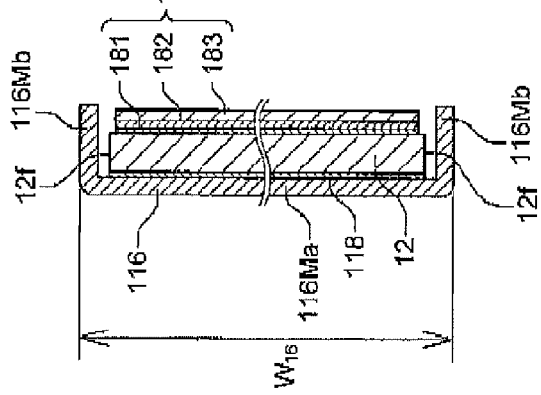
FIG. 6C is an enlarged cross sectional view thereof along a B-B line in FIG. 6A.
Figure 6B:
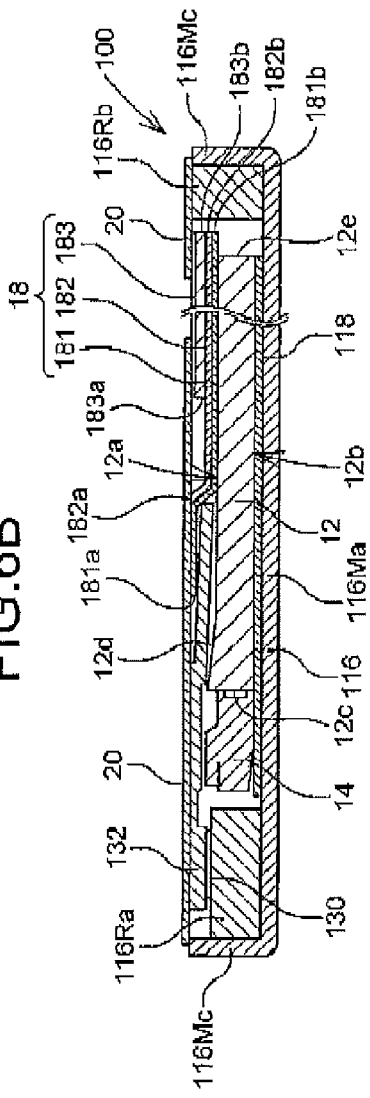
FIG. 6B is an enlarged cross sectional view thereof along an A-A line in FIG. 6A.

The resin frame member 16Ra is, similarly to the example in FIGS. 6A-6C, arranged at a position along the light incident surface 12c of the light guiding plate 12, and the resin frame member 16Rb is, similarly to the example in FIGS. 6A-6C, arranged at a position along the side surface 12e opposite to the light incident surface 120. A front-back direction dimension (width dimension) of the resin frame member 16Ra is formed more largely than that of the resin frame member 16Rb. By being formed of, preferably, white resin, these resin frame members 16Ra and 16Rb reflect, towards the light guiding plate 12, light leaking from the side surfaces 12c and 12e of the light guiding plate 12 opposite to the resin frame members 16Ra and 16Rb efficiently, and contribute to increase in light emission efficiency from a principal surface 12a of the light guiding plate 12. Hereinafter the principal surface 12a is also referred to as an emission surface 12a.

On the contrary, the metal frame members 16M are formed by sheet metal forming of a sheet material made of metal, such as aluminum alloy or stainless steel, and are arranged respectively along a pair of side surfaces of the side surfaces of the light guiding plate 12, the pair of side surfaces connecting and edges of the light incident surface 12c where the light source 14 is arranged with end edges of the side surface 12e opposite to the light incident surface 12c. The metal frame member 16M on the left and the metal frame member 16M on the right illustrated in FIG. 1A are symmetrically formed. Thickness of the metal frame members 16M is, for example, 0.1 mm to 0.2 mm. Thickness of the resin frame members 16Ra and 16Rb is set to an appropriate value equal to or greater than the thickness of the metal frame members 16M.

Further, in order to increase the light emission efficiency from the principal surface 12a of the light guiding plate 12, white ink, silver, or the like may be coated on inner surfaces (surfaces facing the light guiding plate 12) of the metal frame members 16M.

The joint portions 16J between the metal frame members 16M and the resin frame members 16Ra and 16Rb are arranged at all of four corners of the frame 16 having the rectangular frame shape. Further, at the joint portions 16J, the resin frame members 16Ra and 16Rb and the metal frame members 16M have complementary concave and convex shapes. Specifically, they are configured such that a part of the resin frame members 16Ra and 16Rb is extended so as to go around to the metal frame members 16M, and the resin frame members 16Ra and 16Rb and the metal frame members 16M overlap (at least partially) each other in an up-down direction. Or, they are configured such that a part of the metal frame members 16M is extended so as to go around to the resin frame members 16Ra and 16Rb, and the resin frame members 16Ra and 16Rb and the metal frame members 16M overlap (at least partially) each other in the up-down direction. At the joint portions 16J, the resin frame members 16Ra and 16Rb and the metal frame members 16M are formed integrally with each other, by insert molding or the like.

The joint portions 16J are not necessarily provided at corner portions of the frame 16, and as appropriate, may be provided at positions offset from the corner portions in a left-right direction or the front-back direction. Furthermore, as necessary, the resin frame members 16Ra and 16Rb and the metal frame members 16M may be configured to not overlap each other in the up-down direction. Moreover, a concave portion for absorbing thickness of a later described wiring board 132 (see FIGS. 5A-5C) of the light source 14 or thickness of a double sided tape 130 (see FIGS. 5A-5C) or the like used in fixing the wiring board 132, may be provided on a lower end surface or an upper end surface of the resin frame member 16Ra.

In the example of FIGS. 1A-1C, both the resin frame members 16Ra and 16Rb and the metal frame members 16M are exposed to form an outer surface of the frame 16, at the joint portions 16J. On the contrary, in the example of FIG. 2A, at the joint portions 16J between the resin frame members 16Ra and 16Rb and the metal frame members 16M, an end portion of the metal frame member 16M is configured to partially cut into the resin frame member 16Ra without being exposed to the outer surface of the frame 16.

Figure 2B:
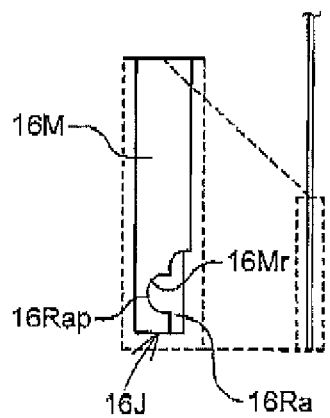
FIG. 2B is a side view of main parts according to an application example of the planar illumination device illustrated in FIGS. 1A-1C with the main parts enlarged.

Further, in the example of FIG. 23, a part of the resin frame member 16Ra is extended so as to go around to the metal frame member 16M, and furthermore, by formation of a projecting portion 16Rap projecting downwards (in a left direction in FIG. 2B) in the resin frame member 16Ra and formation of a notched portion 16Mr corresponding to the projecting portion 16Rap in the metal frame member 16M, complementary shapes that are more complicated than those of the example in FIGS. 1A-1C are formed.

Figure 3:
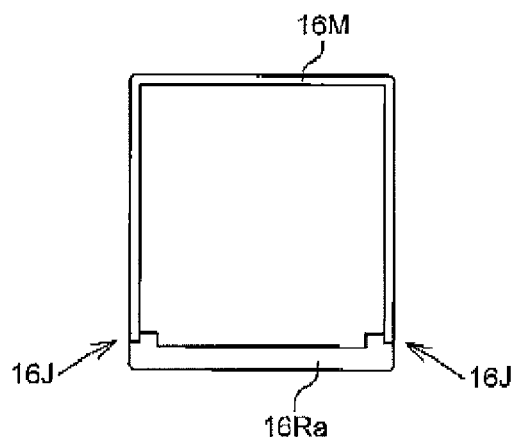
FIG. 3 is a plan view of a frame according to an application example of the planar illumination device illustrated in FIGS. 1A-1C.

In the example of FIGS. 1A-1C, at a portion along the side surface 12e opposite to the light incident surface 12c, of the side surfaces of the light guiding plate 12, the resin frame member 16Rb is arranged, but a metal frame member may be arranged at this portion as illustrated in FIG. 3. In the example of FIG. 3, the metal frame member 16M arranged at a portion along the side surface 12e opposite to the light incident surface 12c, of the side surfaces of the light guiding plate 12, is integrated with the metal frame members 16M respectively arranged along the pair of side surfaces connecting the end edges of the light incident surface 12c with the end edges of the side surface 12e opposite to the light incident surface 12c. The joint portions 16J between the resin frame member 16Ra and the metal frame members 16M are arranged only at two corners of the four corners of the rectangular frame shape, the two corners at a light incident surface 12c side of the light guiding plate 12.

Further, the planar illumination device 10 according to the embodiment of the present invention includes optical sheets 18 and 118 arranged by being layered over the principal surfaces of the light guiding plate; and the light guiding plate 12, together with the optical sheets 18 and 118, is fixed to the metal frame member 16M of the frame 16 via the light shielding sheet 20. For the light shielding sheet 20, a light shielding property is not necessarily demanded depending on required specifications, and if prevention of light leakage is not demanded, an adhesive sheet (adhesive tape) having a sticking function but not having a light shielding function may be used instead of the light shielding sheet 20 (and thus, in this description, those including a light shielding sheet, an adhesive sheet (adhesive tape), and the like will also be referred to as "adhesive sheets").

Figures 4A, 4B:
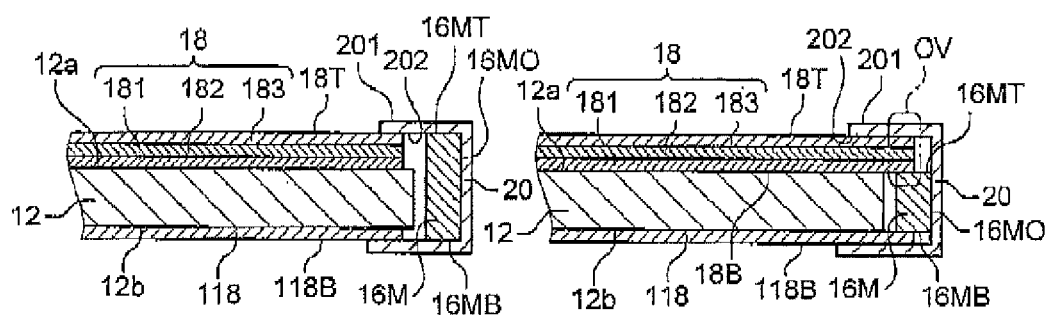
FIG. 4A is an enlarged cross sectional view including also the light shielding sheet, along a C-C line in FIG. 1A.
FIG. 4B is an enlarged cross sectional view including also the light shielding sheet, along a C-C line in FIG. 1A, and a different example of arrangement between a metal frame member and optical sheets from FIG. 4A.

More specifically, as illustrated in FIG. 4A, of a pair of the principal surface 12a and a principal surface 12b of the light guiding plate 12, the optical sheet 18 is arranged by being layered on the emission surface 12a side, and a reflecting sheet 118 is arranged by being layered on the other principal surface 12b side. Hereinafter the reflecting sheet 118 is also referred to as an optical sheet 118. As the light shielding sheet 20, one like a so-called double sided tape is widely used in general, the double sided tape having adhesive layers on both a first surface 201, which is an outer surface of the light shielding sheet 20, and a second surface 202, which is an inner surface of the light shielding sheet 20, the inner surface opposite to the light guiding plate 12. The second surface 202 of the light shielding sheet 20 is stuck such that the second surface 202 extends from a surface of the optical sheet 18 on the emission surface 12a side to a surface of the reflecting sheet 118 on the other principal surface 12b side so as to wrap around an outer surface 16MO of the metal frame member 16M of the frame 16. The first surface 201 of the light shielding sheet 20 is used for fixing an LCD (illustration thereof omitted) to the planar illumination device 10. In the example of FIG. 4A, an upper end surface 16MT of the metal frame member 16M and a surface 18T of the optical sheet 18 (a third sheet 183 in the illustrated example) are arranged on the same plane. Further, a lower end surface 16MB of the metal frame member 16M and a surface 118B of the reflecting sheet 118 are arranged on the same plane.

In the example illustrated in FIG. 4B, an overlap portion OV is formed, where the optical sheet 18 and the metal frame member 16M of the frame 16 overlap each other at least partially, in a plan view of the optical sheet 18. In this overlap portion OV, the upper end surface 16MT of the metal frame member 16M is arranged below a lower surface 18B of the optical sheet 18 (a lower surface of a first sheet 181 in the illustrated example, but limitation not being made thereto), and is covered by the optical sheet 18 at least partially. FIG. 4B illustrates that the optical sheet 18 has a width dimension such that an end portion of the optical sheet 18 is partially over the upper end surface 16MT of the metal frame member 15M, but the width dimension of the optical sheet 18 may be configured to match a width dimension $W_{16}$ of the metal frame member 16M (see FIG. 6C). Further, in the example of FIG. 4B, the first sheet 181, a second sheet 182, and the third sheet 183 are configured such that their end edge portions are aligned with one another in a plan view thereof and that they have the same width dimension, but they may have width dimensions such that only the third sheet 183 positioned on the uppermost stage covers, or the third sheet 183 and second sheet 182 cover, at least a part of the upper end surface 16MT of the metal frame member 16M.

Furthermore, in FIG. 4B, the light shielding sheet 20 is illustrated in a mode of being bent at right angles, but the light shielding sheet 20 may be stuck such that the light shielding sheet 20 is bent from a corner portion of the upper end surface 16MT of the metal frame member 16M towards a corner portion of the upper surface 18T of the optical sheet 18, and further bent to follow the upper surface 18T at the corner portion of the upper surface 18T of the optical sheet 18. Further, in a bent portion of the light shielding sheet 20, perforations, a groove, or the like, may be provided to make the light shielding sheet 20 easy to be bent.

If a light shielding sheet not having an adhesive layer in a portion arranged on the outer surface 16MO of the metal frame member 16M and in a portion arranged on the surface of the reflecting sheet 118 is used the portions of the first surface 201 of the light shielding sheet 20; decrease in handling ability due to unexpected sticking of the light shielding sheet 20 is able to be prevented.

Further, by use of a film (illustration thereof omitted) for covering and hiding the portion arranged on the outer surface 16MO of the metal frame member 16M and the portion arranged on the surface of the reflecting sheet 118, necessary handling ability may be ensured.

Figure 5A:
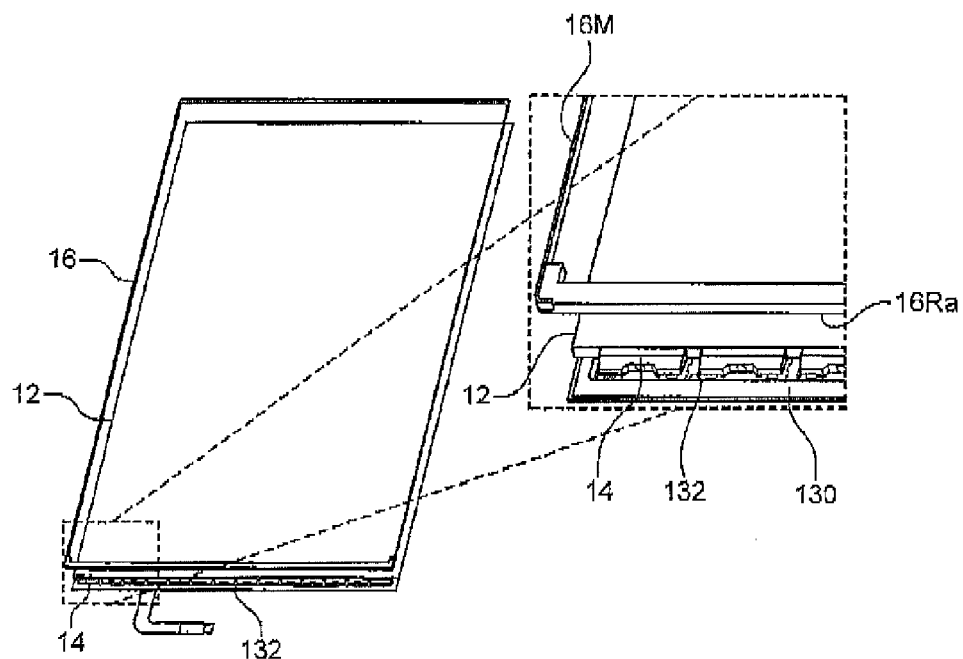
FIG. 5A is a perspective view thereof and an enlarged view of main parts about an explanatory diagram illustrating a configuration of a light incident surface of side surfaces of a light guiding plate of the planar illumination device illustrated in FIGS. 1A-1C, the light incident surface at which a light source is arranged.
Figures 5B, 5C:
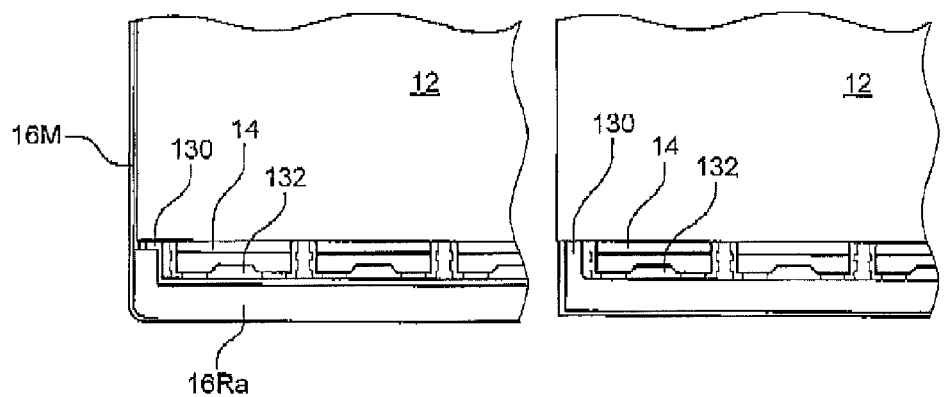
FIG. 5B is a plan view of the main parts about the explanatory diagram illustrating the configuration of the light incident surface of side surfaces of the light guiding plate of the planar illumination device illustrated in FIGS. 1A-1C, the light incident surface at which the light source is arranged.
FIG. 5C is a plan view of the main parts excluding a frame from FIG. 5B about the explanatory diagram illustrating the configuration of the light incident surface of side surfaces of the light guiding plate of the planar illumination device illustrated in FIGS. 1A-1C, the light incident surface at which the light source is arranged.

As illustrated in FIGS. 5A-5C, the wiring board 132 of the light source 14 is fixed to a lower end surface or an upper end surface (the lower end surface in the illustrated example) of the resin frame member 16Ra via the double sided tape 130. As described above, since, the front-back direction dimension (width dimension) of the resin frame member 16Ra is more largely formed than those of the metal frame members 16M and the resin frame member 16Rb, a sticking margin for the double sided tape 130 is sufficiently secured in the resin frame member 16Ra.

In addition, since the planar illumination device 10 follows the overall configuration of the conventional technique, the following description will additionally be made by referring to the planar illumination device 100 according to the conventional technique illustrated in FIGS. 6A-6C.

In a range of a predetermined width towards a central portion from the light incident surface 12c, the range over the emission surface 12a of the light guiding plate 12, a sloped surface 12d is formed, which makes thickness between the pair of opposite principal surfaces thinner towards the central portion of the light guiding plate, and a range over the emission surface 12a, the range closer to the central portion than the sloped surface 12d, has a constant thickness.

"Effective area" of the emission surface 12a prescribed by the light shielding sheet 20 is an area excluding a "non-effective area", which is unavoidably generated near an end edge portion of the emission surface 12a of the light guiding plate 12, due to reduction in uniformity of emission light influenced by reflection of light at the side surface of the light guiding plate 12 or the like. The planar illumination device described herein maximally achieves effective utilization of the emission light from the effective area by the light shielding sheet 20 covering and hiding the non-effective area in a plan view of the emission surface 12a of the light guiding plate 12. For convenience of explanation, in FIG. 6A, illustration of the light shielding sheet 20 is omitted.

As illustrated in FIG. 6C, the second side wall 116Mb and the pair of side surfaces 12f joining the end portions of the light incident surface 12c and the end portions of the side surface 12e opposite to the light incident surface 12c together are arranged with a gap therebetween. Further, in the illustrated example, as illustrated in FIG. 6B, the side surface 12e of the light guiding plate 12 and the resin frame member 16Rb are arranged with a gap therebetween. The light incident surface 12c of the light guiding plate 12 is adhered closely to the light source 14 basically, and the light source 14 and the resin frame member 16Ra are arranged with a gap therebetween.

Further, according to this embodiment, the optical sheet 18 includes the first sheet 181, which is the first one of layered stages as counted from the emission surface 12a of the light guiding plate 12, the second sheet 182 layered on the first sheet 181, and the third sheet 183 layered on the second sheet 182. For example, the first sheet 181 is a diffusion sheet, the second sheet 182 is a lower prism sheet, and the third sheet 183 is an upper prism sheet. These respective optical sheets 181, 182, and 183 are formed such that; in a state where end edge portions 181b, 182b, and 183b (see FIG. 6B) thereof on the side surface 12e side opposite to the light incident surface 12c are aligned with one another in a plan view thereof, the upper the stage of the optical sheet in the layered stages as counted from the emission surface 12a of the light guiding plate 12 is, the more separated the position of the end edge portion 161a, 182a, or 283a on the light incident surface 12c side of the light guiding plate 12 is from the light incident surface 12o of the light guiding plate 12.

By the embodiment of the present invention configured as described above, the following effects are able to be obtained.

That is, in the planar illumination device 10 according to the embodiment of the present invention, the frame 16 includes the resin frame members 16Ra and 16Rb and the metal frame members 16M, and the frame 16 as a whole is frame shaped, by the respective members being joined together at the joint portions 16J arranged at the end portions of the resin frame members 16Ra and 16Rb and metal frame members 16M. Arrangement of the resin frame members 16Ra and 16Rb and metal frame members 16M in the frame shaped frame 16 is determined in consideration of properties of the resin and metal. Specifically, when the metal frame members 16M are formed of sheet metal, reduction in thickness is not limited in terms of formability in contrast to the resin frame members 16Ra and 16Rb obtained through injection molding or the like of a synthetic resin material. Thus, by arranging the metal frame members 16M at a portion, for which frame narrowing is demanded in particular, the portion of the respective portions of the frame shaped frame 16, the request for the frame narrowing is met. On the contrary, the resin frame members 16Ra and 16Rb are arranged at a portion of the frame shaped frame 16, the portion where frame narrowing is not particularly demanded. Thereby, through effective utilization of the thickness of the resin frame members 16Ra and 16Rb, the components accommodated in the frame are able to be stably and infallibly held therein.

At the portion where the resin frame members 16Ra and 16Rb are arranged, occurrence of contamination is lessened, which is caused by the metal frame members 16M coming into contact with the light guiding plate 12 and the like when a component of the planar illumination device 10, such as the light guiding plate 12, is assembled and positioned with respect to the frame 16 (supposing the case where the resin frame members 16Ra and 16Rb are not present). Further, the resin frame member 16Ra, in particular, ensures insulation from the wiring board 132 of the light source 14. Furthermore, when the resin frame member 16Rb is arranged at the side surface 12e opposite to the light incident surface 12c of the light guiding plate 12, by the resin frame member 16Rb reflecting, towards the light guiding plate 12, light leaking from this side surface 12e, light emission efficiency from the principal surface 12a of the light guiding plate 12 is increased.

Further, the frame 16 is formed in a rectangular frame shape in a plan view thereof, the resin frame member 16Ra forming one side of the rectangular frame shape is arranged along the light incident surface 12c of the light guiding plate 12, and the resin frame member 16Rb forming another side thereof is arranged along the side surface 12e opposite to the light incident surface 12c of the light guiding plate 12. Furthermore, the metal frame members 16M forming the remaining two sides are arranged respectively along the pair of side surfaces 12f connecting the end edges of the light incident surface 12c with the end edges of the side surface 12e opposite to the light incident surface 12c. Moreover, the joint portions 16J are arranged, according to the shapes of the resin frame members 16Ra and 16Rb and metal frame members 16M, at any (see FIG. 3) or all (see FIGS. 1A-1C) of the four corners of the rectangular frame shaped frame, and thereby, each piece forming the rectangular frame shaped frame, excluding its end portions (joint portions) 16J, is formed of only one of the resin frame members 16Ra and 16Rb and the metal frame members 16M. Therefore, of the rectangular frame shaped frame 16, the side at which the metal frame member 16M is arranged contributes to the request for frame narrowing, and the side at which the resin frame member 16Ra or 16Rb is arranged contributes to stable and infallible holding of the components accommodated in the frame.

In addition, by each of the pieces forming the rectangular frame shaped frame being formed of only one of the resin frame members 16Ra and 16Rb and metal frame members 16M, deformation of each the pieces caused by the difference in their thermal expansion coefficients according to the materials forming them is able to be suppressed.

Further, by the complementary concave and convex shapes of the joint portions 16J of the resin frame members 16Ra and 16Rb and the metal frame members 16M adhering closely to each other, the resin frame members 16Ra and 16Rb and the metal frame members 16M are infallibly fixed by being meshed with each ether. Furthermore, the mutual positional relation between the resin frame members 16Ra and 16Rb and metal frame members 16M is accurately determined by the joint portions 16J having the complementary concave and convex shapes joining together.

At the joint portions 16J, the resin frame members 16Ra and 16Rb and the metal frame members 16M are formed integrally with each other, by insert molding or the like, and thereby, a composite frame of metal and resin is formed in a frame shape.

Further, as illustrated in FIGS. 4A-4B, by use of the light shielding sheet 20 with the adhesive layer provided on the surface thereof, the light guiding plate 12, together with the optical sheets 18 and 118, is fixed to the frame 16. Specifically, as illustrated in FIG. 4A and FIG. 40, if the optical sheets 18 and 118 are arranged by being layered over both of the principal surfaces 12a and 12b of the light guiding plate 12; by sticking the light shielding sheet 20 such that the light shielding sheet 20 extends from the surface of the optical sheet on one of the principal surface sides to the surface of the optical sheet on the other principal surface side so as to wrap around the frame, the optical sheets 18 and 118 are fixed to the frame 16, and the light guiding plate 12 sandwiched between the optical sheets 18 and 118 is also fixed to the frame 16. Furthermore, although illustration thereof will be omitted, if the optical sheet is arranged by being layered over one of the principal surfaces (12a or 12b) of the light guiding plate, by sticking the light shielding sheet 20 such that the light shielding sheet 20 extends from the surface of the optical sheet (18 or 118) on one of the principal surface sides to the surface of the other principal surface of the light guiding plate 12 so as to wrap around the frame; the optical sheet (18 or 118) and the light guiding plate 12 are fixed to the frame 16. Therefore, while having the frame configuration of the rectangular frame shape without a bottom portion, the components, such as the optical sheets 18 and 118 and the light guiding plate 12, are fixed to the frame 16 via the light shielding sheet 20, and thickness of the planar illumination device 10 is reduced.

According to the example in FIG. 4B, the end surface of the optical sheet 18 is positioned above the upper end surface 16MT of the metal frame member 16M without being covered by the metal frame member 16M of the frame 16, and is exposed to outside of the metal frame member 16M, but the exposed end surface of the optical sheet 18 is covered and hidden by the light shielding sheet 20. Therefore, light leakage from the end surface of the optical sheet 18 to the outside is not caused, either.

Since the present invention is configured as described above, characteristics, such as frame narrowing, reduction in thickness, and securing necessary rigidity, which are demanded for a planar illumination device, are able to be balanced with one another even more highly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination device, comprising:
 a light guiding plate having one of a pair of opposed principal surfaces serving as a light emission surface;
 a light source arranged at a side surface connecting end edges of the pair of principal surfaces of the light guiding plate; and
 a frame, in which the light guiding plate is arranged, wherein:
 the frame comprises plural frame members arranged along side surfaces of the light guiding plate,
 the plural frame members include a resin frame member, a metal frame member, and a joint portion between the resin frame member and the metal frame member, the joint portion being arranged at end portions of the resin frame member and the metal frame member, and
 for each of the side surfaces of the light guiding plate, only one of the resin frame member and the metal frame member is arranged.

2. The planar illumination device according to claim 1, wherein the frame has a rectangular shape in a plan view thereof, and the joint portion is arranged at any or all of four corners of the rectangular frame shape.

3. The planar illumination device according to claim 1, wherein the metal frame member is arranged along each of a pair of the side surfaces connecting (i) end edges of a light incident surface at which the light source is arranged with (ii) end edges of a side surface opposite to the light incident surface, the light incident surface and the side surface opposite to the light incident surface being of the side surfaces of the light guiding plate.

4. The planar illumination device according to claim 3, wherein the metal frame member is arranged along the side surface opposite to the light incident surface.

5. The planar illumination device according to claim 1, wherein the resin frame member and the metal frame member have, respectively, concave and convex shapes complementary to each other at the joint portion.

6. The planar illumination device according to claim 1, wherein the resin frame member and the metal frame member are integral with each other at the joint portion.

7. The planar illumination device according to claim 1, further comprising:
 optical sheets layered over at least one of the principal surfaces of the light guiding plate, wherein
 the light guiding plate, together with the optical sheets, is fixed to the frame via an adhesive sheet.

8. A planar illumination device, comprising:
 a light guiding plate having one of a pair of opposed principal surfaces serving as a light emission surface;
 a light source arranged at a side surface connecting end edges of the pair of principal surfaces of the light guiding plate; and
 a frame, in which the light guiding plate is arranged, wherein:
 the frame comprises plural frame members arranged along side surfaces of the light guiding plate,
 the plural frame members include a resin frame member, a metal frame member, and a joint portion between the resin frame member and the metal frame member, the joint portion being arranged at end portions of the resin frame member and the metal frame member,
 along at least one of the side surfaces of the light guiding plate, only the resin frame member among the resin and metal frame members is arranged, and
 along the other one or ones of the side surfaces, only the metal frame member of the resin and metal frame members is arranged.

9. The planar illumination device according to claim 8, wherein the frame has a rectangular shape in a plan view thereof, and the joint portion is arranged at any or all of four corners of the rectangular frame shape.

10. The planar illumination device according to claim 8, wherein the metal frame member is arranged along each of a pair of the side surfaces connecting (i) end edges of a light incident surface at which the light source is arranged with (ii) end edges of a side surface opposite to the light incident surface, the light incident surface and the side surface opposite to the light incident surface being of the side surfaces of the light guiding plate.

11. The planar illumination device according to claim 10, wherein the metal frame member is arranged along the side surface opposite to the light incident surface.

12. The planar illumination device according to claim 8, wherein the resin frame member and the metal frame member have, respectively, concave and convex shapes complementary to each other at the joint portion.

13. The planar illumination device according to claim 8, wherein the resin frame member and the metal frame member are integral with each other at the joint portion.

14. The planar illumination device according to claim 8, further comprising:
 optical sheets layered over at least one of the principal surfaces of the light guiding plate, wherein
 the light guiding plate, together with the optical sheets, is fixed to the frame via an adhesive sheet.

* * * * *